(12) United States Patent
Hebgen et al.

(10) Patent No.: US 6,711,332 B2
(45) Date of Patent: Mar. 23, 2004

(54) HIGHLY NEGATIVE-SLOPE DISPERSION COMPENSATING FIBER AND TRANSMISSION SYSTEM INCLUDING SAME

(75) Inventors: Peter G. Hebgen, Horseheads, NY (US); David J. Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 276 days.

(21) Appl. No.: 10/013,297

(22) Filed: Nov. 5, 2001

(65) Prior Publication Data

US 2003/0091309 A1 May 15, 2003

(51) Int. Cl.⁷ .............................. G02B 6/02; H04J 14/02
(52) U.S. Cl. ....................... 385/124; 385/123; 385/126; 385/127; 398/81
(58) Field of Search ................................ 385/123, 124, 385/125, 126, 127, 128, 141; 398/81

(56) References Cited

U.S. PATENT DOCUMENTS

| 4,629,485 A | 12/1986 | Berkey | 65/3.11 |
| 5,361,319 A | 11/1994 | Antos et al. | 385/123 |

(List continued on next page.)

FOREIGN PATENT DOCUMENTS

| EP | 1 130 428 | 9/2001 | G02B/6/16 |
| EP | 1 170 604 | 1/2002 | G02B/6/16 |
| EP | 1 213 595 | 6/2002 | G02B/6/16 |
| EP | 1 217 399 | 6/2002 | G02B/6/16 |
| GB | 1 107 028 | 6/2001 | G02B/6/22 |
| WO | WO 00/67053 | 11/2000 | G02B/6/16 |
| WO | WO 01/71391 | 9/2001 | |
| WO | WO 01/73486 | 10/2001 | G02B/6/00 |

OTHER PUBLICATIONS

Gruener–Nielsen, L. et al., "New Dispersion Compensating Fibres for Simultaneous Compensation of Dispersion and Dispersion Slope of Non–Zero Dispersion Shifted Fibres in the C or L Band", Optical Fiber Communication Conference (OFC), Technical Digest Postconference Edition, Baltimore, MD, Mar. 7–10, 2000, New York, NY: IEEE, US, vol. 1 of 4, Mar. 7, 2000, pp. TuG6–1–TuG6–3.

Wandel, M. et al., "Dispersion compensating fibre with a high figure of merit", 27$^{th}$ European Conference on Optical Communication, Amsterdam, Netherlands, vol. 6, Sep. 30, 2001–Oct. 4, 2001, pp. 52–53.

Gnauck, A. H. et al., "Dispersion and dispersion–slope compensation of NZDSF over the entire C band using higher–order–mode fibre", Electronics Letters, IEE Stevenage, GB, vol. 36, No. 23, Nov. 9, 2000, pp. 1946–1947.

Patent Abstracts of Japan, "Dispersion Compensating Optical Fiber and Optical Transmission Line", Sumitomo Electric Ind Ltd.

*Primary Examiner*—Brian M. Healy
(74) *Attorney, Agent, or Firm*—Randall S. Wayland

(57) ABSTRACT

The present invention relates to a dispersion compensating optical fiber ("DC fiber") having a segmented core and having a negative total dispersion and negative dispersion slope in the C-band. The index profile of the fiber is selected to provide an optical properties suitable for a high performance communication system operating in the C-band wavelength band, i.e., between about 1525 nm to 1565 nm. The DC fiber according to the invention exhibits dispersion slope at 1549 nm more negative than $-3.4$ ps/nM²-km and has a negative $\Delta_2\%$ that is more negative than $-0.4\%$. Preferably, the DC fiber has a total dispersion more negative than $-125$ ps/nm²-km. The DC fiber may be optically connected to a Non-Zero Dispersion Shifted Fiber (NZDSF) in the system to compensate for dispersion thereof. Optionally, the transmission system may include a positive dispersion, positive slope trim fiber.

60 Claims, 11 Drawing Sheets

U.S. PATENT DOCUMENTS

| | | | |
|---|---|---|---|
| 5,448,674 A | 9/1995 | Vengsarkar et al. | 385/123 |
| 5,999,679 A | 12/1999 | Antos et al. | 385/127 |
| 6,178,279 B1 | 1/2001 | Mukasa et al. | 385/123 |
| 6,263,138 B1 | 7/2001 | Sillard et al. | 385/123 |
| 2002/0090186 A1 | 7/2002 | Sillard et al. | 385/123 |
| 2002/0181076 A1 * | 12/2002 | Bickham et al. | 359/334 |
| 2003/0046960 A1 * | 3/2003 | Dawes et al. | 65/391 |
| 2003/0059186 A1 * | 3/2003 | Hebgen et al. | 385/127 |
| 2003/0063881 A1 * | 4/2003 | Hebgen et al. | 385/127 |
| 2003/0101771 A1 * | 6/2003 | Dawes et al. | 65/397 |
| 2003/0128943 A1 * | 7/2003 | Hebgen et al. | 385/123 |
| 2003/0200770 A1 * | 10/2003 | Johnson | 65/397 |

* cited by examiner

HIGHLY NEGATIVE-SLOPE DISPERSION COMPENSATING FIBER AND TRANSMISSION SYSTEM INCLUDING SAME

FIELD OF THE INVENTION

The invention is directed to a dispersion compensating optical fiber and a transmission system including the same, and more particularly to a dispersion compensating optical fiber and transmission system in which the dispersion compensating fiber exhibits a negative dispersion and dispersion slope within the C-band (1525 nm to 1565 nm) to advantageously compensate for slope and dispersion in the transmission system.

BACKGROUND OF THE INVENTION

High data rates are becoming needed for the telecommunications industry. Thus, the search for high-performance optical fibers designed for long distance, high bit rate telecommunications in Dense Wavelength Division Multiplexing (DWDM) systems has intensified. However, these high data rates have penalties associated with them. In particular, dispersion is a significant problem for such systems, particularly those employing large effective area fibers, such as certain Non-Zero Dispersion Shifted Fibers (NZDSF). More specifically, positive dispersion builds as a function of the length of the transmission fiber (e.g., a NZDSF). Dispersion Compensating (DC) fibers included in a cable or in a Dispersion Compensating Module (DCM) have been designed that compensate for such dispersion in such optical transmission systems. These DC fibers generally have negative slope and negative dispersion such that a short length of the DC fiber may be used to compensate for the positive dispersion and positive slope of the longer transmission fiber, for example a NZDSF. For C-band operation between about 1525 nm and 1565 nm, the bend performance, attenuation, and dispersion properties (total dispersion and/or dispersion slope) of the DC fiber are very important. This is particularly true in DC fibers that will be included in a wound spool of a DCM. In particular, having very low total dispersion is advantageous as it allows for compensation with less DC fiber length. Low slope is desirable to compensate for the slope of the transmission fiber in a short length.

Thus, there is a need for a DC fiber that exhibits low attenuation, low bend loss, low dispersion and dispersion slope and is particularly effective at compensating for the dispersion and/or slope of certain Non-Zero Dispersion Shifted Fibers (NZDSF) over the C-band.

Definitions

The following definitions are in accordance with common usage in the art.

The refractive index profile is the relationship between refractive index and optical fiber radius.
A segmented core is one that has multiple segments, such as a first and a second segment (a central core and a moat, for example). Each core segment has a respective refractive index profile and maximum and minimum index therein.
The radii of the segments of the core are defined in terms of the beginning and end points of the segments of the refractive index profile or in terms of the midpoint of the segment in the case of a ring segment. FIG. 2 illustrates the definitions of radii used herein. The same definitions are used for FIGS. 3–6 as well. The radius $R_1$ of the center core segment 22 is the length that extends from the DC fiber's centerline (CL) to the point at which the profile crosses the relative refractive index zero as measured relative to the cladding 30. The outer radius $R_2$ of the moat segment 24 extends from the centerline (CL) to the radius point at which the outer edge of the moat crosses the refractive index zero, as measured relative to the cladding 30. The radius $R_3$ is measured to the half height width where $\Delta_3\%$ is half its maximum value of the ring segment 26. The radius $R_3$ of segment 26 extends from the centerline (CL) to the midpoint 28 of a half-height line segment 27. The midpoint 28 is formed by bisecting the segment 27 between the two intersection points with the ring segment at the half height position of $\Delta_3\%$. The radius $R_4$ is measured from the centerline (CL) to the point where the outermost portion of the ring segment 26 meets the zero refractive index point, as measured relative to the cladding 30.
The effective area is defined as:
$A_{eff}=2\pi(\int E^2\, r\, dr)^2/(\int E^4\, r\, dr)$, where the integration limits are 0 to $\infty$, and E is the electric field associated with the propagated light as measured at 1549 nm.
The term, $\Delta\%$, represents a relative measure of refractive index defined by the equation, $$\Delta\%=100\ (n_i^2-n_c^2)/2n_c^2$$

where $n_i$ is the maximum refractive index in the respective region i (e.g., 22, 24, 26), unless otherwise specified, and $n_c$ is the refractive index of the cladding (e.g., 30) unless otherwise specified.
The term alpha profile, $\alpha$-profile refers to a refractive index profile, expressed in terms of $\Delta(b)\ \%$, where b is radius, which follows the equation, $$\Delta(b)\%=[\Delta(b_o)(1-[|b-b_o|/(b_1-b_o)]^\alpha)]100$$

where $b_o$ is the maximum point of the profile and $b_1$ is the point at which $\alpha(b)\%$ is zero and b is in the range $b_i \leq b \leq b_f$, where $\Delta\%$ is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile, the beginning point of the $\alpha$-profile is the intersection of the $\alpha$-profile and the step profile. In the model, in order to bring about a smooth joining of the $\alpha$-profile with the profile of the adjacent profile segment, the equation is rewritten as;

$$\Delta(b)\%=[\Delta(b_a)+[\Delta(b_o)-\Delta(b_a)]\{(1-[|b-b_o|/(b_1-b_o)]^\alpha\}]100,$$

where $b_a$ is the first point of the adjacent segment.
The pine array bend test is used to compare relative resistance of optical fibers to bending. To perform this test, attenuation loss is measured when the optical fiber is arranged such that no induced bending loss occurs. This optical fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the waveguide conform to a portion of the periphery of the pins.

SUMMARY OF THE INVENTION

The DC fiber in accordance with the invention disclosed and described herein is particularly well suited to compensating for dispersion and dispersion slope of certain NZDSF in the C-band.

According to an embodiment of the invention, a DC fiber is provided having a refractive index profile selected to provide a particular set of properties (attributes) that make it suited for transmission systems designed to operate in the C-band wavelength window of between about 1525 nm and 1565 nm.

The DC fiber in accordance with the invention is particularly suitable for compensating for build up of dispersion and/or dispersion slope in an NZDSF having a kappa of about 50. Thus, the DC fiber may be coupled to a NZDSF to form a transmission system and is designed to compensate for the dispersion and/or slope (and most preferably both) of the NZDSF, preferably across the entire C-band. The transmission system including the DC fiber may also preferably include optical amplifiers, filters, Wavelength Division Multiplexing operation, and other conventional system components. Preferably, the DC fiber is wound onto a spool and included in a Dispersion Compensating (DC) module.

In accordance with an embodiment of the invention, the total dispersion defined herein as the measurable dispersion (total dispersion equals chromatic dispersion plus the waveguide dispersion plus profile dispersion) of a transmission system employing 100 km of a NZDSF transmission fiber and a suitable length of the present invention DC fiber advantageously results in a system which has less than +/−40 ps/nm residual dispersion; more preferably less than 35 ps/nm and most preferably less than 30 ps/nm over the entire C-band (between 1525 nm and 1565 nm). Fiber profiles have been designed in accordance with the invention that exhibit attenuation of less than 3 dB/km at 1549 nm. Moreover, the bend loss, as measured by a pin array test, is preferably less than 40 dB, more preferably less than 30 dB, and most preferably less than 25 dB. Thus, the DC fiber in accordance with the invention exhibits excellent bend loss and may be, therefore, advantageously wound onto, and used in, small diameter DCM's to be utilized in transmission systems for compensating dispersion and dispersion slope of long lengths of NZDSF.

In a preferred embodiment of the DC fiber, a plurality of segments characterize the fiber and each of the segments of the core includes a refractive index profile. Together, these segments make up the refractive index profile of the fiber. At least one of the segments preferably has an α-profile. Most preferably the fiber includes a core profile having a positive $\Delta_1\%$ central core segment, a negative $\Delta_2\%$ moat region, and a positive $\Delta_3\%$ ring segment. Preferably, the ring segment has a non-step index profile and its radius $R_3$ is offset from the moat segment.

According to the present invention, the DC fiber has a segmented core having at least three segments. The refractive index profile of the segmented core is selected to provide a negative total dispersion and a negative dispersion slope at 1549 nm, and more preferably over the entire C-band from 1525 nm to 1565 nm. In accordance with the invention, the DC fiber exhibits a highly negative dispersion slope. In particular, the DC fiber's dispersion slope is more negative than −3.4 ps/nm²-km at 1549 nm, and the DC fiber includes a moat delta $\Delta_2\%$ that is more negative than −0.4%.

In accordance with another embodiment of the invention, a DC fiber is provided having a dispersion slope is more negative than −4.0 ps/nm²-km at 1549 nm.

Preferably, the present invention DC fiber has a total dispersion at 1549 nm more negative than −125 ps/nm-km. In a further embodiment of the invention, the total dispersion more negative than −165 ps/nm-km at 1549 nm. In further embodiments, the total dispersion is more negative than −200 ps/nm-km; and may be more negative than −250 ps/nm-km. Preferably, the total dispersion for the DC fiber at 1549 nm ranges between about −100 and −300 ps/nm-km. In certain embodiments, the total dispersion may range between about −165 and −270 ps/nm-km at 1549 nm. Most preferably, the total dispersion for the DC fiber ranges from −100 to −165 ps/nm-km.

In some embodiments, the DC fiber may exhibit an even more highly negative dispersion slope that is more negative than −4.0 ps/nm²-km at 1549 nm. In the most negative slope embodiments, the dispersion slope may be more negative than −4.5 ps/nm²-km; and even more negative than −5.0 ps/nm²-km at 1549 nm. Preferably, the dispersion slope ranges between −3.4 and −6.3 ps/nm²-km at 1549 nm. In other embodiments, the dispersion slope may range between −4.5 and −6.0 ps/nm²-km at 1549 nm. In all embodiments, the dispersion slope of the DC fiber is preferably more negative than −1.5 ps/nm²-km over the entire C-band from 1525 nm to 1565 nm.

The DC fiber preferably has a kappa value, defined as the total dispersion at 1549 nm divided by the dispersion slope at 1549 nm, of less than 60 nm; and more preferably less than 52 nm. Preferably, kappa is between 35 nm and 55 nm for all embodiments. In preferred embodiments, kappa ranges between 40 nm and 52 nm; and most preferably between 40 nm and 48 nm. Kappa for the DC fiber is preferably between 35 nm and 75 nm over the entire C-band range between 1525 nm to 1565 nm.

The DC fiber in accordance with the invention has a central core segment having a positive $\Delta_1\%$, a moat segment adjoining the central core segment and having a negative $\Delta_2\%$, and a ring segment surrounding the moat segment having a positive $\Delta_3\%$, all as compared to cladding that is preferably pure silica. According to the invention, $\Delta_1\%$ of the central core segment is preferably greater than 1.7%. $\Delta_2\%$ of the moat segment is preferably more negative than −0.4%; and more preferably more negative than −0.65%. The $\Delta_3\%$ of the ring segment is preferably greater than 0.5%.

The DC fiber in accordance with embodiments of the invention preferably exhibits, in combination, a central core segment having a positive $\Delta_1\%$ greater than 1.5%, a moat segment adjoining the central core segment and having a negative $\Delta_2\%$ more negative than −0.5%, and a ring segment surrounding the moat segment having a positive $-_3\%$ greater than 0.5%.

According to further embodiments, the DC fiber in accordance with the invention preferably exhibits, in combination, a central core segment having a positive $\Delta_1\%$ between 1.6% and 1.9%, a moat segment adjoining the central core segment having a negative $\Delta_2\%$ between −0.6% and −0.75%, and a ring segment adjoining the moat segment having a positive $\Delta_3\%$ between 0.65% and 1.2%.

The effective area of the DC fiber at 1549 nm in accordance with the invention is greater than 13 $\mu m^2$; more preferably greater than 15 $\mu m^2$; and most preferably greater than 17 $\mu m^2$.

In accordance with another embodiment of the invention, an optical transmission system is provided having a dispersion compensating optical fiber with a refractive index profile being selected to provide a dispersion slope more negative than −3.4 ps/nm²-km at 1549 nm and wherein the fiber includes a $\Delta_2\%$ more negative than −0.4%. Preferably also, the dispersion compensating fiber exhibits a total dispersion at 1549 nm more negative than about −125 ps/nm-km.

In accordance with yet another embodiment of the invention, an optical transmission system is provided having a dispersion compensating optical fiber with a refractive index profile selected to provide a dispersion slope more negative than −4.0 ps/nm²-km at 1549 nm.

Further features and advantages of the invention will be set forth in the detailed description which follows, and will be readily apparent to those of ordinary skill in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate several embodiments of the invention, and together with the description serve to explain the principles and operation of the invention.

DETAILED DESCRIPTION OF THE INVENTION

Figure 1:
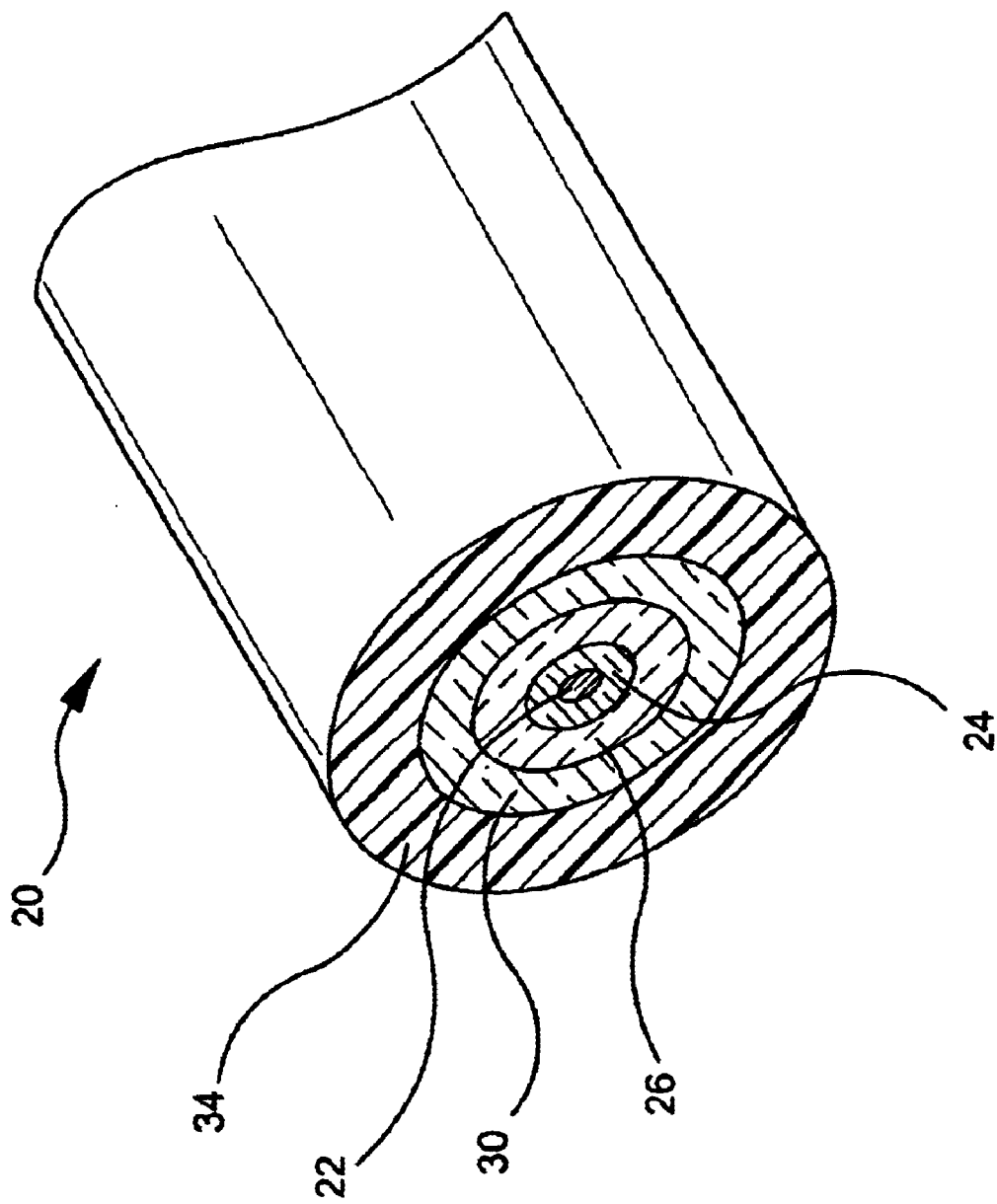
FIG. 1 illustrates a cross-sectioned perspective view of the various segments of the DC fiber in accordance with the invention.

The DC fiber in accordance with the invention may be embodied in a family of segmented core designs that yield a very particular set of desired properties (attributes) as fully described herein. The family of DC fiber designs include, but are not limited to, the particular embodiments of described herein. Thus, it should be recognized that modifications to the particular embodiments described herein may be made without departing from the scope of the invention.

A first illustrative embodiment of the DC fiber is described with reference to FIGS. 1 and 2. The DC fiber 20 includes at least three segments in the core thereof. It should be understood that FIG. 1, as shown, is not drawn to scale and the relative sizes of the layers have been exaggerated for clarity. Preferably, the DC fiber 20 has a central core segment 22, an adjacent cylindrical moat segment 24 surrounding the central core segment, and a cylindrical ring segment 26 surrounding the moat segment. The ring segment 26 is further surrounded by a cylindrical cladding 30 that extends to a radius of about 62.5 μm from the centerline (CL). The entire cladding 30 of the fiber 20 is preferably coated with a protective coating 34 such as a UV curable urethane acrylate or other suitable coating. The coating 34 may consist of several layers having different properties. For example, a first innermost coating layer may have a lower modulus of elasticity than a second outermost coating. However, it should be understood that any suitable coating may be applied utilizing conventional methods.

The various core segments 22, 24, 26 of the fiber 20 preferably include dopants to alter their refractive index relative to the cladding 30. Central core segment 22 preferably includes germania-doped silica to increase its refractive index relative to the cladding 30. The cladding 30 is preferably manufactured from pure silica. Moat segment 24 is preferably formed by doping silica glass with a suitable down-dopant such as fluorine. The ring segment 26 is formed similarly to the core segment by utilizing silica with a suitable up-dopant such as germania. Alternative dopants may be employed provided suitable levels of index change relative to the cladding and low attenuation may be achieved.

Thus, it will be recognized that by the addition of such dopants, a DC fiber core having a precisely defined profile is formed as is illustrated herein, for example, in FIG. 1. In particular, by the addition of suitable amounts of dopants, the central core segment 22 is made to have an up-doped positive $\Delta_1\%$, the moat segment 24 is made to have a down-doped negative $\Delta_2\%$, and the ring segment 26 is made to have an up-doped positive $\Delta_3\%$. Each of $\Delta_1\%$, $\Delta_2\%$ $\Delta_3\%$ is defined as being positive or negative as compared to the refractive index of the cladding 30, as is conventional practice.

As was mentioned above, the DC fiber in accordance with the invention is particularly effective at compensating for dispersion and slope of a NZDSF such as LEAF® fiber manufactured by Corning Incorporated. In particular, the DC fiber 20 in accordance with the invention is particularly well suited for compensating for positive dispersion and positive dispersion slope of such a NZDSF fiber. More particularly, the DC fiber 20 according to the invention has been designed to compensate for dispersion and dispersion slope of a NZDSF having a total dispersion at 1549 nm of about 4.2 ps/nm-km, a dispersion slope at 1549 nm of about 0.086 ps/nm²-km, and a kappa defined as the total dispersion divided by the dispersion slope at 1549 nm of about 49 nm. In order to compensate for total dispersion and dispersion slope of such a NZDSF and do so in a small fiber length of DC fiber, the DC fiber must have both a high negative dispersion and a high dispersion slope at 1549 nm.

Preferably, the ratio of dispersion divided by dispersion slope (defined herein as kappa) for the DC fiber should be within a defined range of between 40 nm and 60 nm at 1549 nm.

The DC fiber in accordance with the invention is particularly well suited for compensating for any NZDSF having a dispersion slope of between about 0.07 and 0.1 ps/nm²-km at 1549 nm, a dispersion of between about 3.4 and 5.0 ps/nm-km at 1549 nm, and a kappa of between 40 and 60 nm at 1549 nm.

Figure 7:
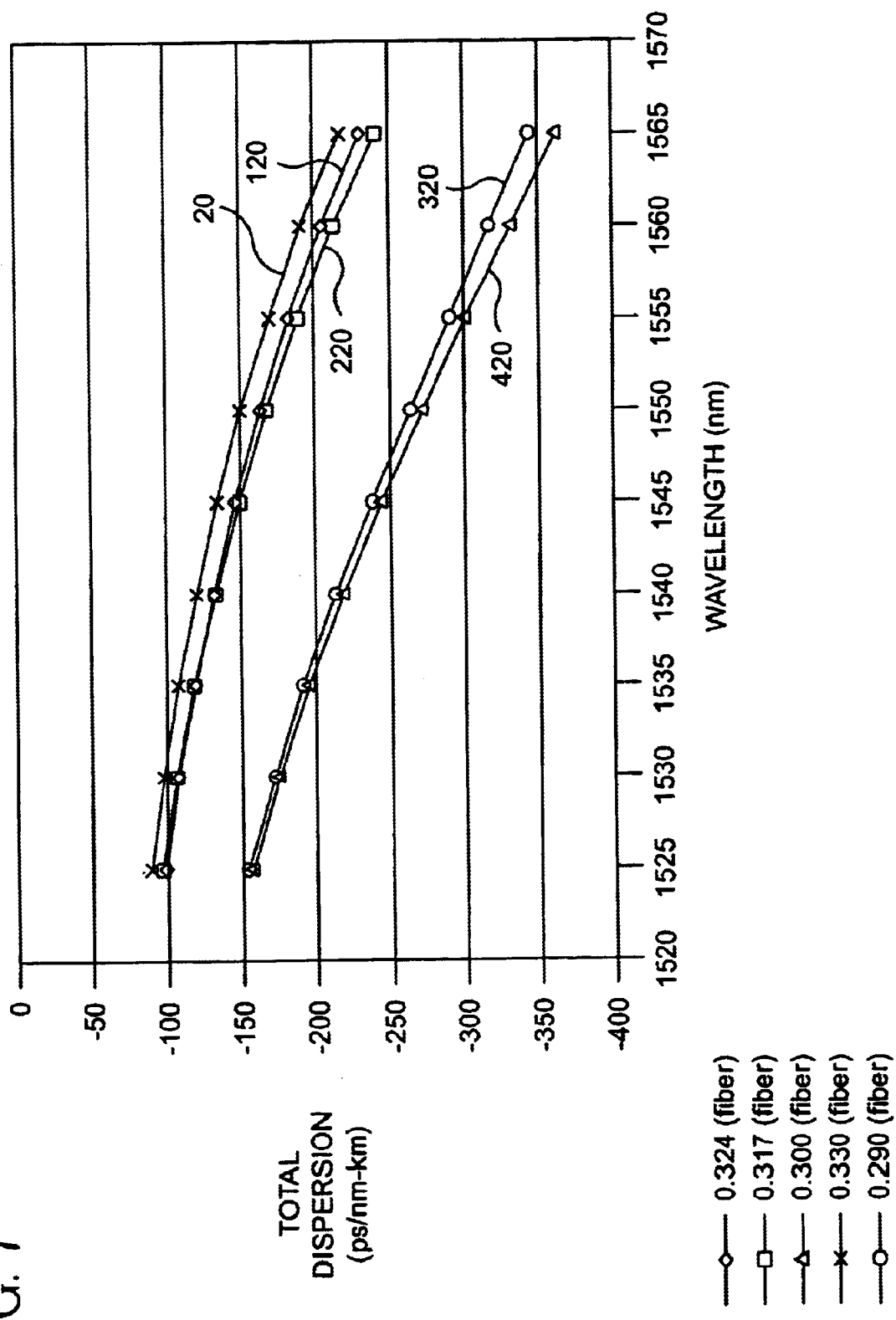
FIG. 7 is a plot of total dispersion vs. wavelength for several embodiments of DC fiber in accordance with the invention.

In particular, as is illustrated in FIG. 7, the family of DC fibers preferably exhibits a total dispersion ranging between about −75 ps/nm-km and −375 ps/nm-km over the entire C-band (1525 nm to 1565 nm) operating window. More preferably, the total dispersion of the family of DC fibers according to the invention ranges between about −100 and −300 ps/nm-km at 1549 nm. According to certain embodiments, the total dispersion may range between −165 and −270 ps/nm-km at 1549 nm, as is illustrated in FIG. 7. According to further embodiments of the invention, the DC fiber may exhibit a total dispersion that is more negative than −125 ps/nm-km. In other embodiments of the invention, total dispersion may be more negative than −165 ps/nm-km; more negative than −200 ps/nm-km; or even more negative than −250 ps/nm-km, all at 1549 nm.

As is illustrated in FIGS. 2–6, the structure of the refractive index profile of the family of DC fibers is selected to provide a dispersion slope (FIG. 8) that is more negative than −3.4 ps/nm²-km. In other embodiments of the invention, dispersion slope may be more negative than −4.0 ps/nm²-km; more negative than −4.5 ps/nm²-km; and even more negative than −5 ps/nm²-km, all at 1549 nm. Preferably, the DC fiber in accordance with the invention has a dispersion slope at 1549 nm of between about −3.4 ps/nm²-km and −6.3 ps/nm²-km at 1549 nm. In other embodiments, the dispersion slope is between −4.5 ps/nm²-km and −6.0 ps/nm²-km at 1549 nm. For all embodiments, the dispersion slope of the DC fiber is more negative than −1.5 ps/nm²-km over the entire C-band from 1525 nm to 1625 nm. It will be recognized that these relatively low negative dispersion values and very low negative slope values enable both dispersion and dispersion slope to be compensated for in the NZDSF over the entire C-band (1525 nm to 1565 nm) with a short length of DC fiber ($1/40^{th}$ to $1/70_{th}$ of the length of the transmission fiber). In particular, the DC fiber is particularly effective at compensating for NZDSF's having kappas of less than 55 nm at 1549 nm. Certain DC fibers in accordance with the invention are particularly effective at compensating for such a NZDSF as described above with a very short length of DC fiber wherein the DC fiber exhibits a dispersion slope more negative than −4.0 ps/km²-nm at 1549 nm, and a total dispersion more negative than −200 ps/km-nm at 1549 nm.

Figure 9:
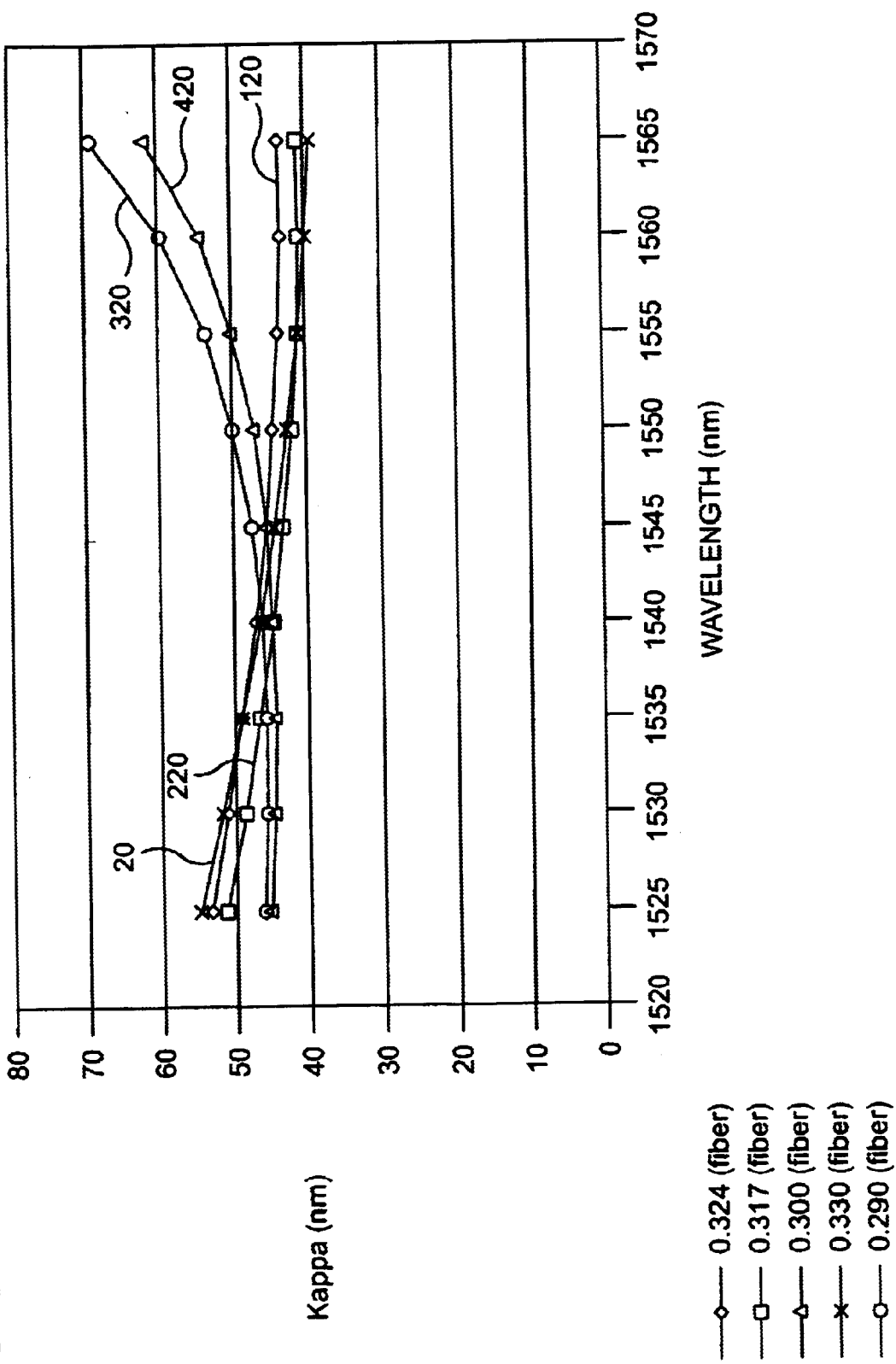
FIG. 9 is a plot of kappa vs. wavelength for several embodiments of DC fiber in accordance with the invention.

As is illustrated in FIG. 9, when compensating for such NZDSF's, it is desired that kappa, defined as the total dispersion divided by the dispersion slope, is between about 35 nm and 55 nm at 1549 nm; more preferably between 40 nm and 52 nm; and most preferably between 40 nm and 48 nm. Preferably, the kappa of the DC fiber is slightly lower than the kappa for the NZDSF at 1549 nm. For all DC fibers according to the invention, kappa preferably ranges between about 35 nm and 75 nm over the entire C-band of 1525 nm to 1565 nm. Most preferably, kappa has a value less than 60 nm at 1549 nm; and more preferably less than 52 nm at 1549 nm.

As is illustrated in FIGS. 2–6, the DC fiber has a refractive index profile that includes a central core segment having a maximum $\Delta_1\%$, a moat segment abutting the central core segment having a most negative $\Delta_2\%$, and a ring segment surrounding the moat segment having a maximum $\Delta_3\%$, and wherein $\Delta_1\%$ is positive, $\Delta_2\%$ is negative, and $\Delta_3\%$ is positive, all as compared to the cladding. According to the invention, the DC fiber preferably includes, in combination, a $\Delta_1\%$ that is greater than 1.5%; a $\Delta_2\%$ more negative than −0.5%; and a $\Delta_3\%$ that is greater than 0.5%. According to a further embodiment, the DC fiber includes, in combination, a $\Delta_1\%$ that is between 1.5% and 2.2%; a $\Delta_2\%$ that is between −0.5% and −0.8%; and a $\Delta_3\%$ that is between 0.5% and 1.3%. In accordance with yet further embodiments, the DC fiber includes, in combination, a $\Delta_1\%$ that is between 1.6% and 1.9%; a $\Delta_2\%$ is between −0.6% and −0.75%; and a $\Delta_3\%$ is between 0.65% and 1.2%. According to another embodiment, the DC fiber includes a $\Delta_1\%$ that is between 1.7% and 1.9%; a $\Delta_2\%$ that is between −0.6% and −0.75%; and a $\Delta_3\%$ that is between 0.7% and 1.1%. The DC fiber functions best for compensating for the dispersion slope and total dispersion with a profile structure having, in combination, a ring segment with a $\Delta_3\%$ greater than 0.5%, a moat segment with a $\Delta_2\%$ more negative than −0.65%, and a central core segment with a $\Delta_1\%$ greater than 1.7%.

The DC fiber, in order to provide the desired performance attributes, preferably includes the following further refractive index features. The various radius and $\Delta\%$ conventions that are shown in FIG. 2 apply to all embodiments of DC fiber in FIGS. 2–6. In particular, the DC fiber preferably has a central core segment having an outer radius $R_1$ in a range of between about 1.5 μm and 2.2 μm. The moat segment has an outer radius $R_2$ in a range of between about 5.0 μm and 6.7 μm; and the a ring segment has a midpoint radius $R_3$ in the range of between about 6.5 μm and 9.0 μm. More preferably, the DC fiber includes a central core segment having an outer radius $R_1$ in a range of between about 1.7 μm and 1.9 μm; a moat segment having an outer radius $R_2$ in a range of between about 5.3 μm and 6.4 μm; and a ring segment having a midpoint radius $R_3$ in a range of between about 7.2 μm and 8.3 μm.

Combining the radii dimensions and the core deltas, the DC fiber preferably includes, in combination, a central core segment having a $\Delta_1\%$ in the range of about 1.7% to 1.9% and a radius $R_1$ in the range of about 1.7 μm to 1.9 μm, a moat segment having a $\Delta_2\%$ in the range of about −0.6% to −0.75% and a radius $R_2$ in the range of about 5.3 μm to 6.4 μm, and a ring segment having a $\Delta_3\%$ in the range of about 0.7% to 1.1% and a mid point radius $R_3$ in the range of about 7.2 μm to 8.3 μm.

The DC fiber in accordance with the invention preferably includes a central core segment having an outer radius $R_1$; and a moat segment having an outer radius $R_2$ wherein a core/moat ratio defined as $R_1$ divided by $R_2$ is less than 0.34; more preferably less than 0.33; and most preferably less than 0.32.

Figure 3:
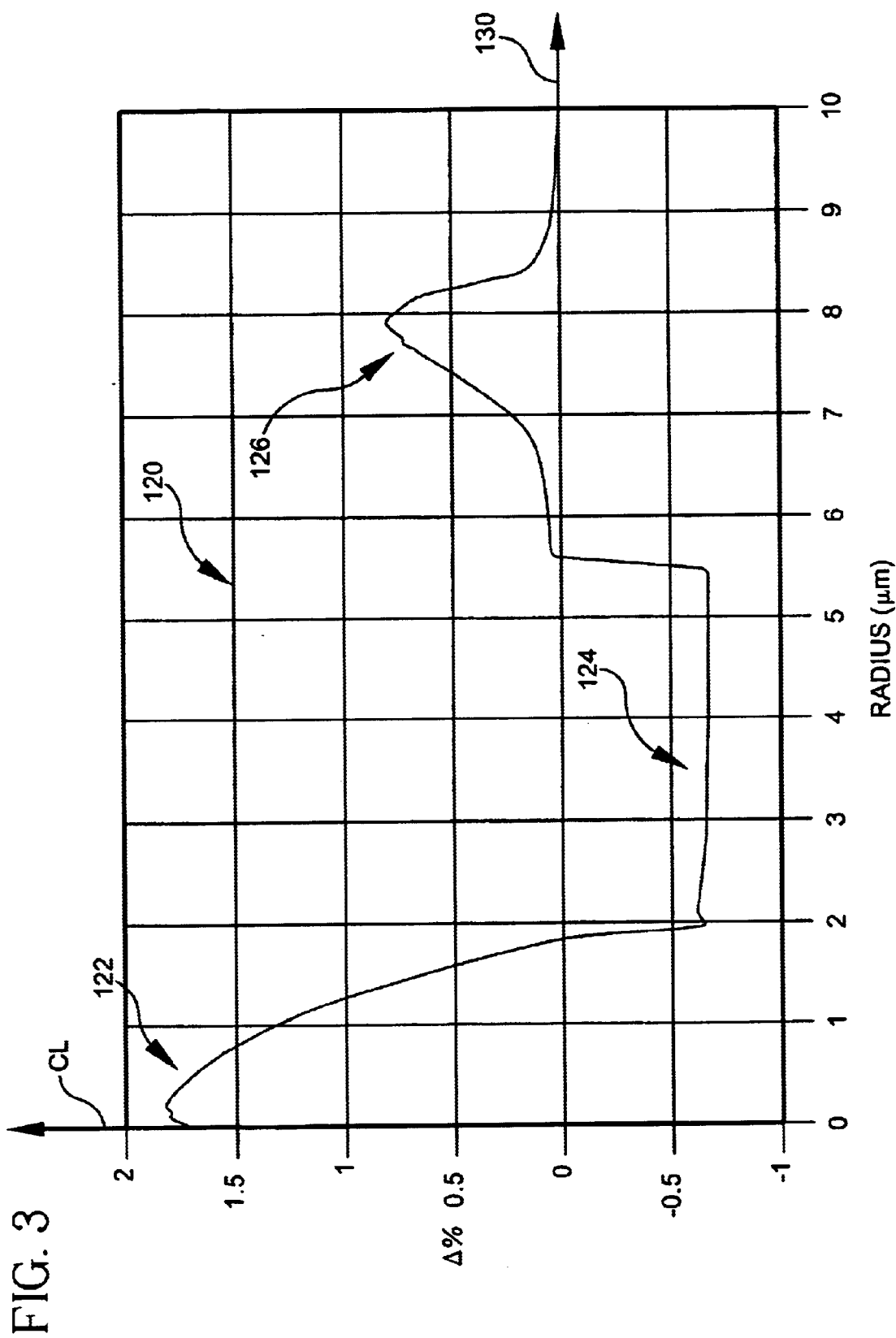
FIG. 3 is a graph of $\Delta\%$ vs. core radius (μm) of a second embodiment of DC fiber in accordance with the invention.
Figure 4:
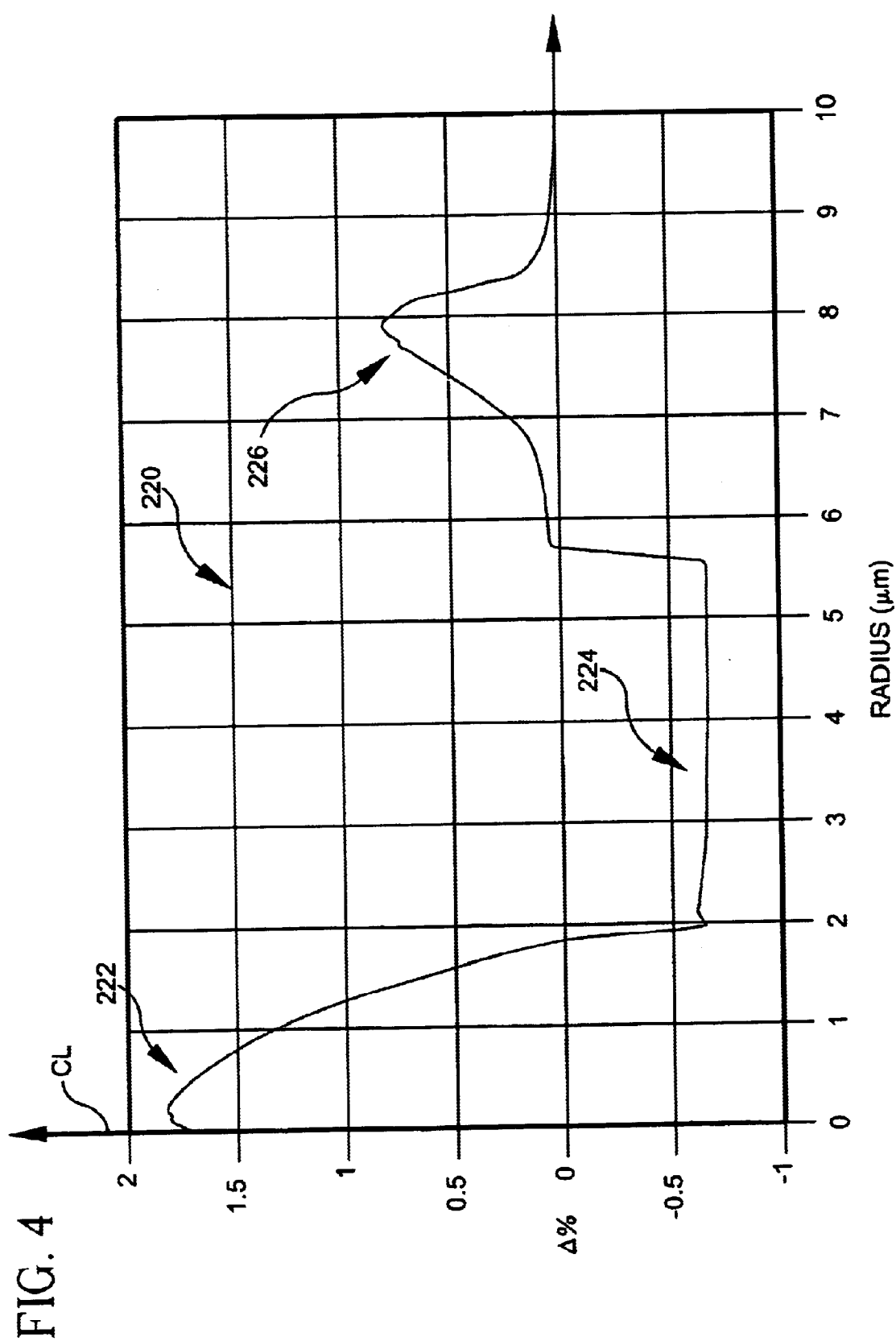
FIG. 4 is a graph of $\Delta\%$ vs. core radius (μm) of a third embodiment of DC fiber in accordance with the invention.
Figure 5:
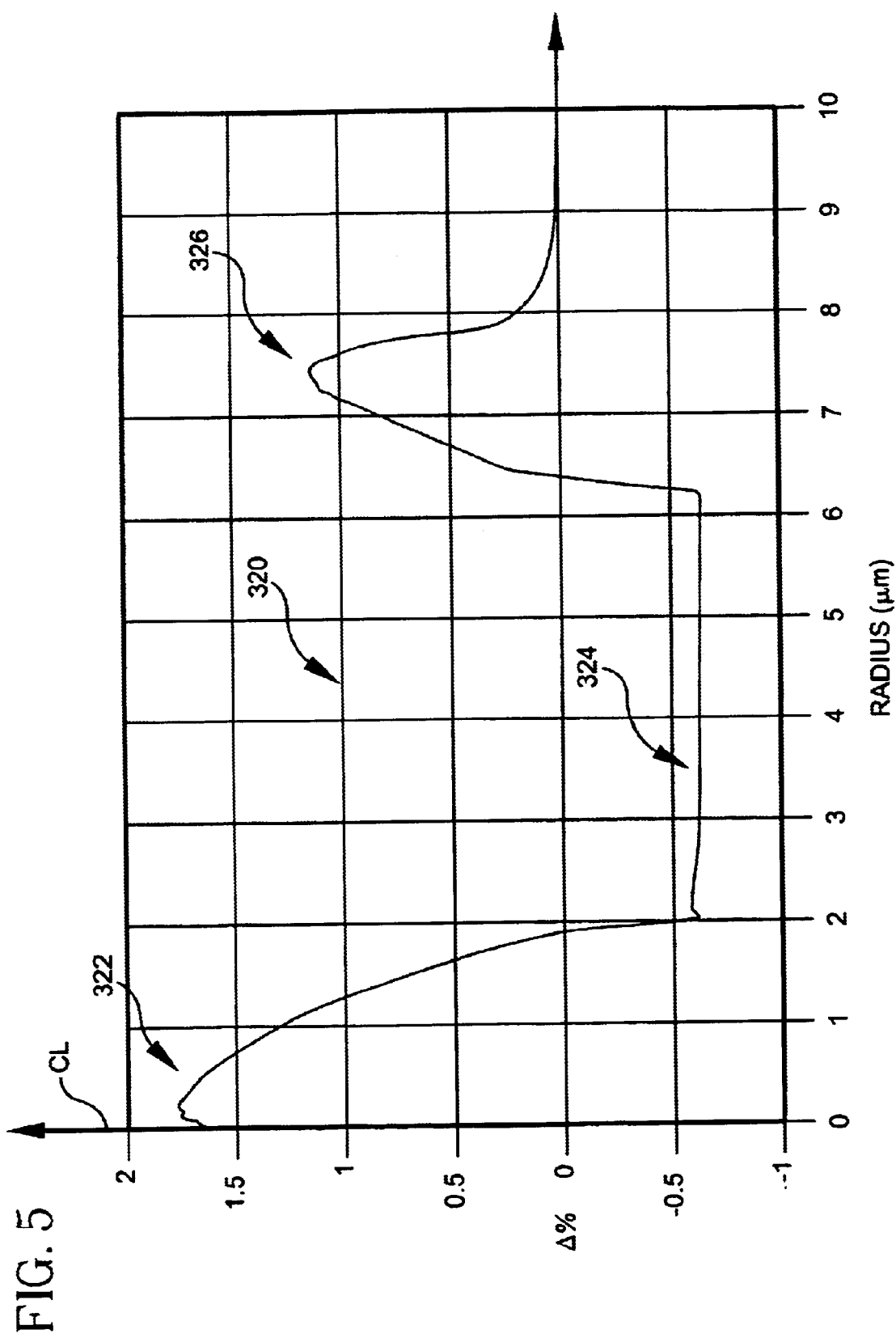
FIG. 5 is a graph of $\Delta\%$ vs. core radius (μm) of a fourth embodiment of DC fiber in accordance with the invention.

It was determined by the inventors, as will be apparent from viewing FIGS. 2–6, that the moat and ring location should be appropriately placed in order to derive the desired slope and dispersion attributes for the DC fiber. In particular, it was recognized by the inventors that the product (P) of the radii $R_2$ times $R_3$ should be equal to a predetermined constant value. To illustrate the extremes, FIG. 2 has a moat that has an outer radius $R_2$ that is smaller, resulting in a relatively narrow moat width. Thus, to achieve the desired properties, the ring segment radii $R_3$ needs to be placed out further. In FIG. 5, the moat radii $R_2$ is relatively large, resulting in a broader moat width. In this scenario, the ring should be placed closer to the centerline (CL) in the radial direction to achieve the desired slope and dispersion properties. In particular, in order to achieve the desired properties, it is desirable to have the aforementioned product (P) range between about 40 and 50 $\mu m^2$; more preferably between about 42 and 48 $\mu m^2$; and most preferably between about 43 and 46 $\mu^2$.

The DC fiber in accordance with the invention preferably exhibits an effective area of greater than 13 $\mu m^2$ at 1549 nm; more preferably greater than 15 $\mu m^2$; and most preferably greater than 17 $\mu m^2$. The DC fiber also exhibits good bending properties. In particular, the DC fiber has a pin array of less than 40 dB at 1549 nm; more preferably less than 30 dB at 1549 nm; and most preferably less than 25 dB at 1549 nm.

Figure 10:
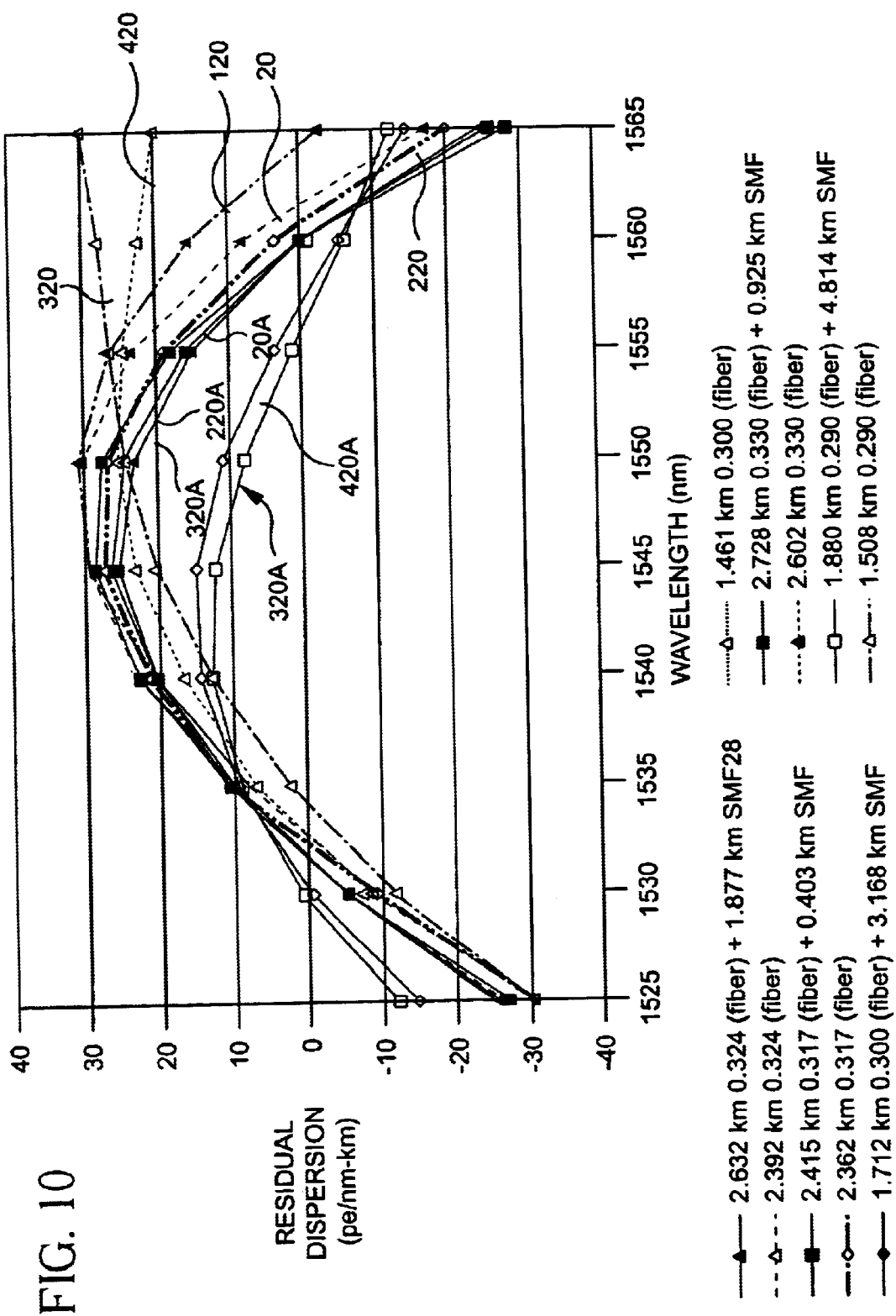
FIG. 10 is a plot of residual dispersion vs. wavelength for several embodiments of transmission systems including the DC fiber in accordance with the invention.
Figure 11:
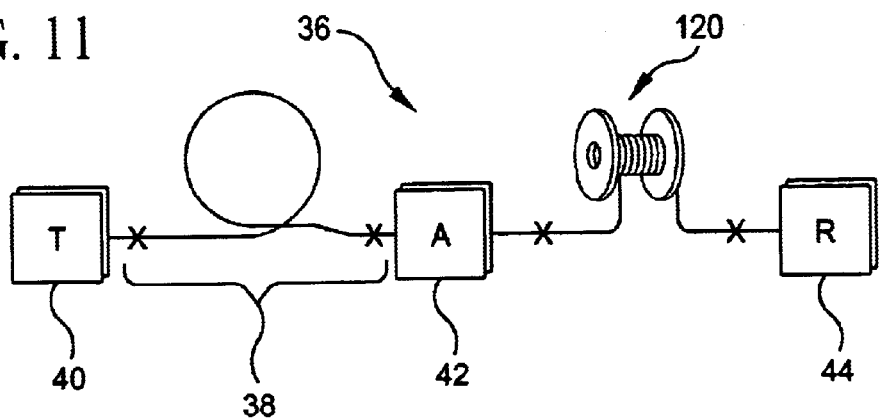
FIG. 11 is a diagram of an embodiment of transmission system including a DC fiber in accordance with the invention.

By way of example, and not to be considered limiting, a transmission system 36 is illustrated in FIG. 11 having a 100 km length of a NZDSF 38, such as LEAF® fiber manufactured by Corning Incorporated, having a positive dispersion of about 4.2 ps/nm-km at 1549 nm, a positive dispersion slope of about 0.086 ps/nm²-km at 1549 nm and a kappa of about 49 nm at 1549 nm. In one representative system, the built up dispersion of the NZDSF 38 is compensated for by a shorter length of about 2.39 km of DC fiber 120 in accordance with the invention. In this example, the DC fiber 120 has a dispersion of about −160 ps/nm-km at 1549 nm and a dispersion slope of about −3.6 ps/nm²-km at 1549 nm. As shown in FIG. 10, the residual dispersion of the system is about +/−31 (ps/nm) for the span. Similar examples may be found in FIG. 10 wherein the NZDSF was compensated by a shorter length of the DC fiber (see dashed plots labeled 20, 220, 320, and 420).

It will be apparent that using the DC fiber 120 in accordance with the invention in the form of a DCM having a total dispersion ranging from about −75 ps/nm-km to −375 ps/nm-km over the entire C-band and a dispersion slope of between about −3.4 ps/nm²-km to about −6.3 ps/nm²-km over the entire C-band, the total residual dispersion over the entire C-band from 1525 nm to 1565 nm can be made to be very low. As illustrated by FIG. 10, the residual dispersion can be made to be less than about +/−35 ps/km-nm for the transmission system 36 over the entire C-band from 1525 nm to 1565 nm.

Figure 12:
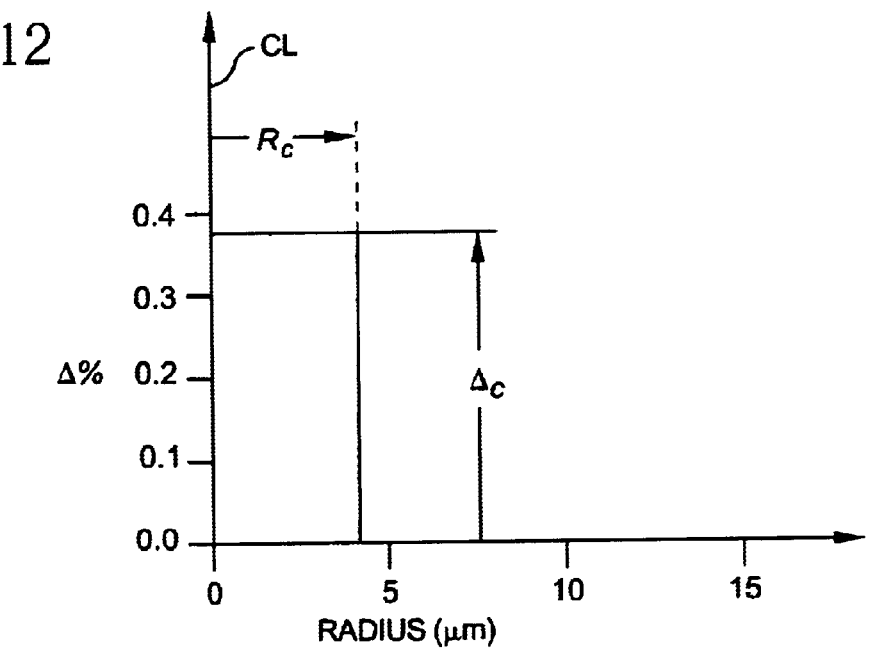
FIG. 12 is a refractive index profile of an embodiment of trim fiber utilized in a transmission system in accordance with the invention.
Figure 13:
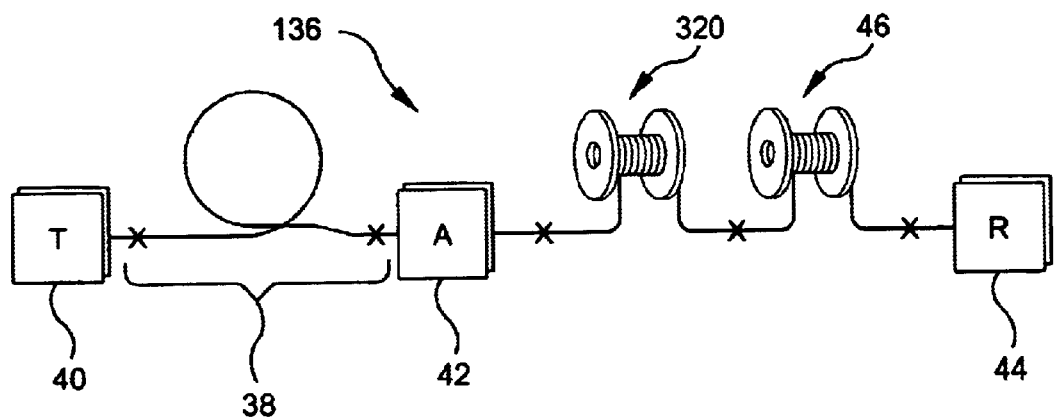
FIG. 13 is a diagram of an embodiment of transmission system including the combination of a DC fiber and a trim fiber in accordance with the invention.

In the example shown in FIG. 13, optically serially coupling a section of trim fiber 46 to a segment of DC fiber (e.g., 320) improves the residual dispersion of the transmission system 136 even further. For example, adding a length of standard Single Mode Fiber (SMF) as the trim fiber 46 may lower the residual dispersion to less than +/−30 ps/km-nm; more preferably less than +/−20 ps/km-nm over the entire C-band; and most preferably even less than +/−15 ps/km-nm over the entire C-band for a span of 100 km of transmission fiber 38. Preferably, the SMF trim fiber 46 has a step-type refractive index profile as is shown in FIG. 12 with a delta of about 0.38% and a radius Rc of about 3.5 $\mu m$. The trim fiber 46 preferably has a total dispersion of between about 14 and 20 ps/nm²-km at 1549 nm, and a dispersion slope of between about 0.04 and 0.07 ps/nm²-km at 1549 nm.

By way of further example, serially coupling a 4.8 km length of SMF trim fiber 46 to the DC fiber (e.g., 320) results is a significantly lower residual dispersion over the entire transmission system as is illustrated by plot labeled 320A in FIG. 10. By way of further clarification, the system 136 includes a first section of positive dispersion, positive dispersion slope transmission fiber 38, such as the NZDSF described above, a DC fiber (e.g., 320) in accordance with the invention having a slope preferably more negative than −3.4 ps/nm²-km, and a length of trim fiber 46. The trim fiber 46 is a positive slope, positive dispersion fiber and has a lower slope but higher total dispersion than the NZDSF 38.

The transmission systems 36, 136 may include conventional elements such as a transceiver 40, optical amplifier 42, and receiver 44. Optionally, the transmission systems 36, 136 may couple to one or more additional lengths of NZDSF instead of having a receiver. Further additional components such as filters, couplers, and amplifiers may be included in the transmission system. Further examples of trimmed transmission systems are illustrated in FIG. 10 labeled as 20A, 120A, 220A, and 420A. Certain ones of the systems, 320A and 420A for example, include a trim fiber length that is greater than the length of the DC fiber to which it is coupled. As will be recognized, the addition of the trim fiber lowers the residual dispersion of the transmission system span. In particular, the combination of the transmission fiber with the DC fiber and trim fiber provided a dispersion behavior of the system that is more linear as a function of wavelength.

Table 1, set forth below, defines a family of DC fibers (labeled as examples 1–5) according to the invention that have the desired properties that are particularly well suited for compensating for slope and dispersion of a NZDSF having a total dispersion of between about 3.4 and 5.0 ps/nm-km at 1549 nm, a dispersion slope of between 0.07 and 0.1 ps/nm²-km at 1549 nm, and a kappa of between 40 and 60 nm at 1549 nm. It should be recognized that in the examples that follow, that attenuation is quite low and bending induced loses are acceptable.

Example 1

Referring again to FIG. 2, a refractive index profile plot of $\Delta\%$ vs. radius ($\mu m$) is illustrated. This is a first embodiment of the DC fiber 20 described herein and corresponds to Example 1 in Table 1 below. In particular, central core segment 22 has an alpha profile having an alpha of about 2, a maximum $\Delta_1\%$ of 1.87 and an outer radius $R_1$ of about 1.77 microns. The adjacent moat segment 24 surrounds and abuts the core segment 22 and has a step index profile having a slight taper defined by having a $\Delta_2\%$ which is slightly less negative adjacent to its innermost radius $R_1$ than adjacent to its outer radius $R_2$. The moat segment 24 has an outer radius $R_2$ of about 5.33 $\mu m$ and a maximum negative $\Delta_2\%$ of about −0.71%. The Example 1 embodiment includes a ring segment 26 having a significant volume portion located at a radius $R_3$. This radius $R_3$ is the mid point radius of the ring segment 26 as defined above. $R_3$ is measured to the midpoint 28 of the half-height width 27 of the ring segment 26. The ring segment 26 surrounds and abuts the moat segment 24 and includes a radius $R_3$ of 8.03 $\mu m$, a half height width 27 of the ring segment 26 of about 0.95 $\mu m$, and a $\Delta_3\%$ of about 0.73%. The ring segment 26 includes a first tapering portion 25 that extends from the body 29 of the ring segment 26 towards the edge of the moat segment 24 at $R_2$. A second tapered portion 31 extends from the body 29 to the beginning of the cladding 30 at $R_4$.

Figure 2:
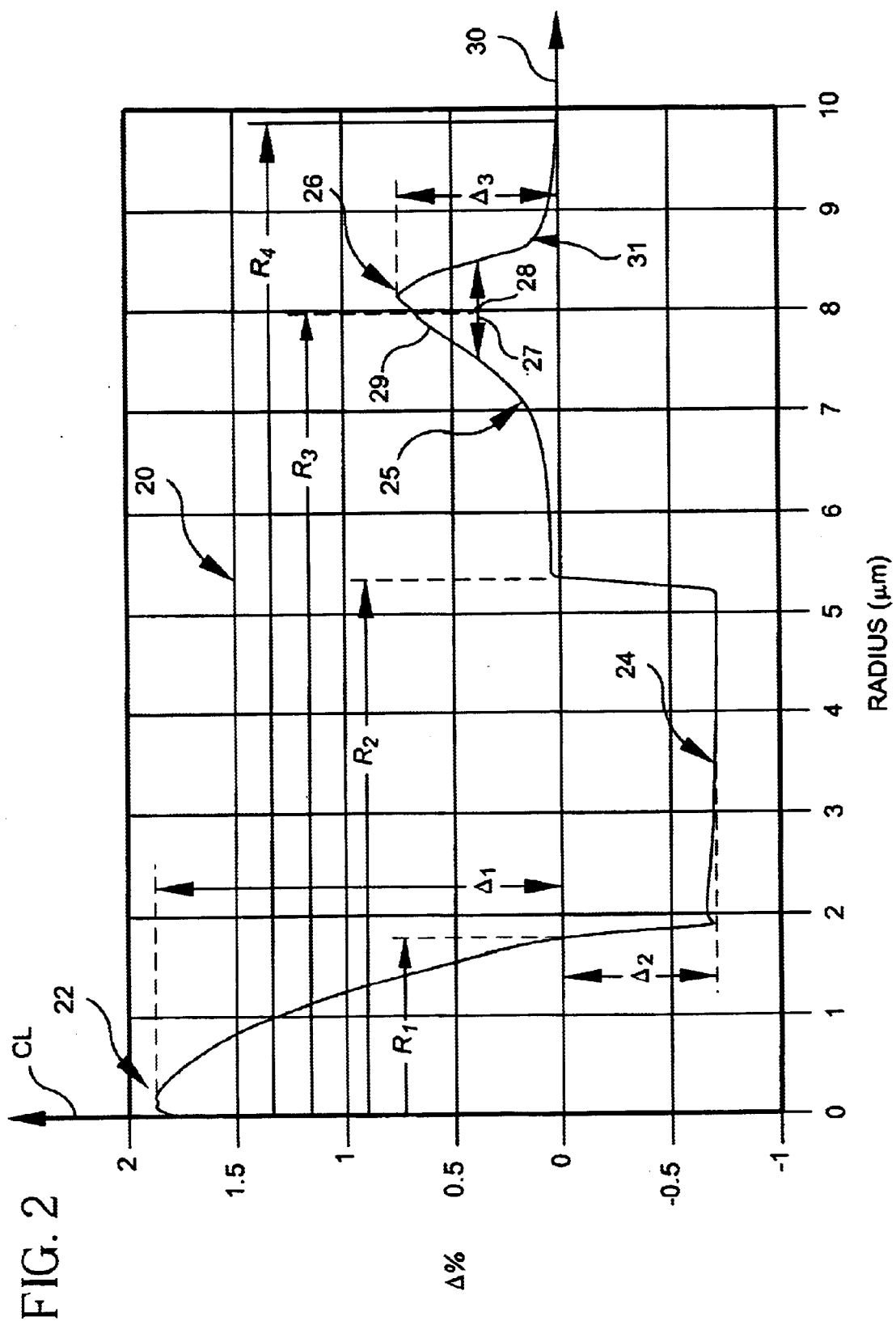
FIG. 2 is a graph of $\Delta\%$ vs. core radius (μm) of a first embodiment of DC fiber in accordance with the invention.

The first DC fiber 20 in accordance with the invention was modeled having the structure as shown in FIG. 2. The core structure is also described in Table 1.

Figure 8:
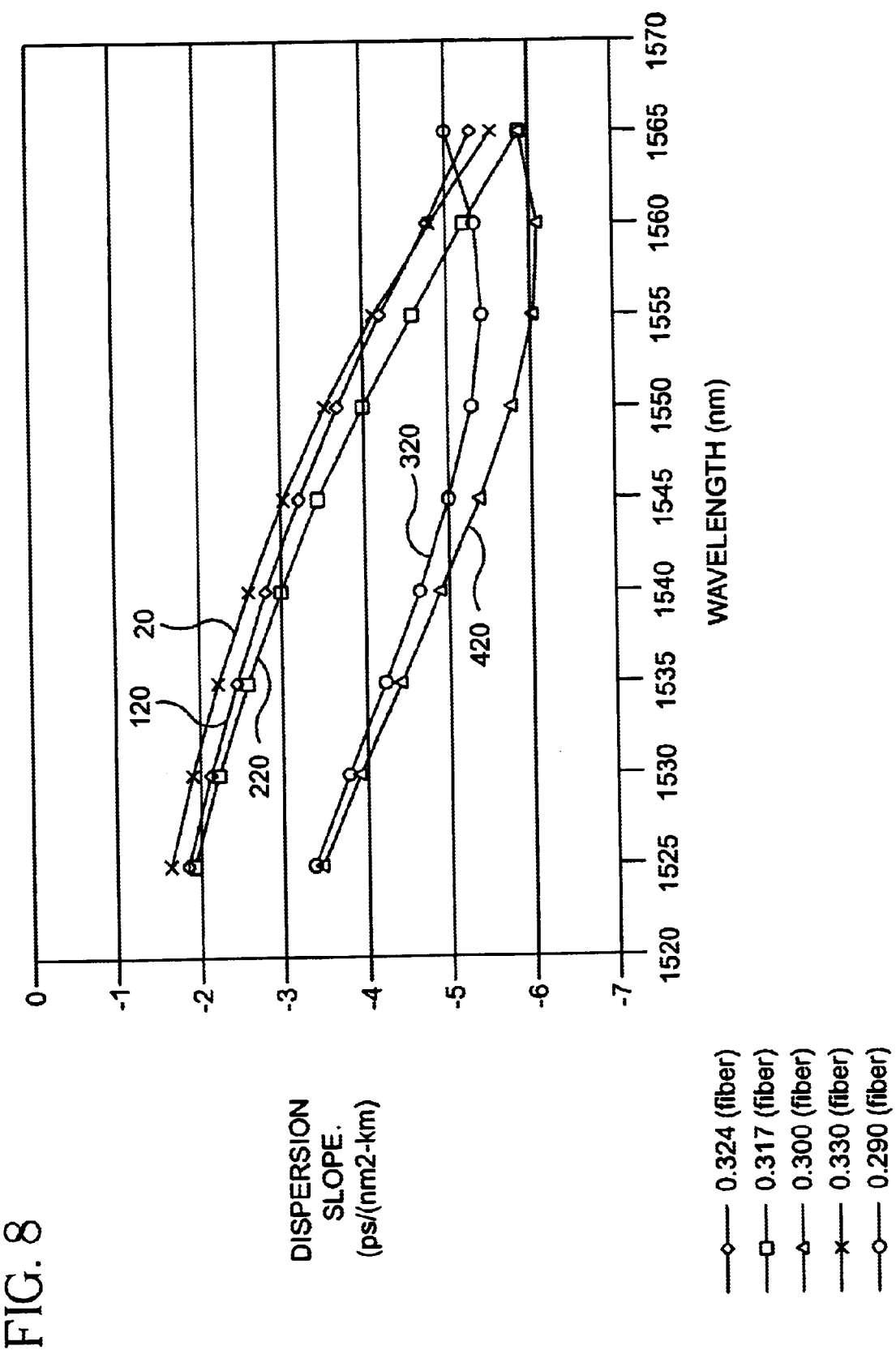
FIG. 8 is a plot of dispersion slope vs. wavelength for several embodiments of DC fiber in accordance with the invention.

As illustrated in FIGS. 7–9, this embodiment of DC fiber 20 has the following predicted dispersion, slope and kappa properties:

total dispersion at 1525 nm of about −89 ps/nm-km;
total dispersion at 1549 nm of about −147 ps/nm-km;
total dispersion at 1565 nm of about −218 ps/nm-km;

dispersion slope at 1525 nm of about −1.6 ps/nm²-km;
dispersion slope at 1549 nm of about −3.43 ps/nm²-km;
dispersion slope at 1565 nm of about −5.6 ps/nm²-km;
kappa at 1525 nm of about 55 nm;
kappa at 1549 nm of about 43 nm; and
kappa at 1565 nm of about 39 nm.

In addition, the model of the DC fiber 20 predicts:
cut off wavelength, $\lambda_c$, of 1993 nm (the cutoff wavelength of the highest of the $LP_{11}$, and $LP_{02}$ higher order modes above $LP_{01}$ for a straight DC fiber);
effective area, $A_{eff}$, of 14.2 $\mu m^2$ at 1549 nm;
attenuation at 1549 nm of 1.6 dB/km; and
pin array bend loss of 21.5 dB at 1549 nm.

Example 2

A second DC fiber 120 in accordance with the invention was modeled having the refractive index profile shown in FIG. 3. The definition of the parameters of the refractive index profile for the DC fiber 120, in particular, $\Delta_1\%$, $\Delta_2\%$ $\Delta_3\%$, $R_1$, $R_2$, $R_3$, and $R_4$ are the same as defined in FIG. 2. In this case, the α-profile of the core segment 122 had an α of 2, a maximum $\Delta_1\%$ of 1.80%, and an outer $R_1$ of 1.81 $\mu$m. The moat segment 124 exhibits a tapered step profile, wherein the taper is such that the depth of the moat (as compared to cladding 130) is lesser at the end closest to the centerline (CL). Moat segment 124 has a most negative $\Delta_2\%$ of −0.67%, and an outer radius $R_2$ of 5.59 $\mu$m. The ring segment 126 has a $\Delta_3\%$ of 0.79%, $R_3$, the midpoint radius defined above, of 7.79 $\mu$m, and a midpoint width of 1.02 $\mu$m. Additional properties and characterizations may be found in Table 1.

As illustrated in FIGS. 7–9, this DC fiber 120 has the following predicted dispersion, dispersion slope, and kappa properties:
total dispersion at 1525 nm of about −97 ps/nm-km;
total dispersion at 1549 nm of about −160 ps/nm-km;
total dispersion at 1565 nm of about −231 ps/nm-km;
dispersion slope at 1525 nm of about −1.8 ps/nm²-km;
dispersion slope at 1549 nm of about −3.6 ps/nm²-km;
dispersion slope at 1565 nm of about −5.3 ps/nm²-km;
kappa at 1525 nm of about 53 nm;
kappa at 1549 nm of about 45 nm; and
kappa at 1565 nm of about 43 nm.

In addition, the model of fiber 120 predicts:
cut off wavelength, $\lambda_c$, of 2006 nm (the cutoff wavelength of the highest of the $LP_{11}$ and $LP_{02}$ higher order modes above $LP_{01}$ for a straight DC fiber);
effective area, $A_{eff}$, of 15.4 1 $\mu m^2$ at 1549 nm;
attenuation at 1549 nm of 1.5 dB/km; and
pin array bend loss of 20.2 dB at 1549 nm.

A DC fiber was manufactured in accordance with the profile shown in FIG. 3 at a draw speed of 7 m/s and a draw tension of 150 grams. This embodiment of DC fiber exhibited a slope of −3.83 ps/nm²-km at 1549 nm, a kappa of 44 at 1549 nm, and an attenuation of 1.3 dB/km at 1549 nm. Thus, the modeling shows good correlation with the actual fiber results.

Example 3

A third example of DC fiber 220 in accordance with the invention having a profile illustrated in FIG. 4 was also modeled. The definition of the parameters of the refractive index profile for the DC fiber 220, in particular, $\Delta_1\%$, $\Delta_2\%$ $\Delta_3\%$, $R_1$, $R_2$, $R_3$, $R_4$ are the same as defined in FIG. 2. The core segment 222 has a relative index $\Delta_1$ of 1.80% and an outer radius $R_1$ of 1.81 $\mu$m. The core segment 222 includes an α-profile having an α of 2. The moat segment 224 has a $\Delta_2\%$ of −0.67%, and outer segment radius $R_2$ of 5.68 $\mu$m. The ring segment 226 has a $\Delta_3\%$ of 0.81% and a midpoint radius $R_3$ of 7.81 $\mu$m and a half height width of about 1.0 $\mu$m.

As shown in FIGS. 7–9, this DC fiber 220 has the following predicted dispersion, dispersion slope, and kappa properties:
total dispersion at 1525 nm of about −97 ps/nm-km;
total dispersion at 1549 nm of about −164 ps/nm-km;
total dispersion at 1565 nm of about −241 ps/nm-km;
dispersion slope at 1525 nm of about −1.9 ps/nm²-km;
dispersion slope at 1549 nm of about −3.9 ps/nm²-km
dispersion slope at 1565 nm of about −5.9 ps/nm²-km
kappa at 1525 nm of about 51 nm;
kappa at 1549 nm of about 42 nm;
kappa at 1565 nm of about 41 nm;

In addition, the model of the DC fiber 220 predicts:
cut off wavelength, $\lambda_c$, of 2011 nm (the cutoff wavelength of the highest of the $LP_{11}$ and $LP_{02}$ higher order modes above $LP_{01}$ for a straight DC fiber);
effective area, $A_{eff}$ of 15.3 $\mu m^2$ at 1549 nm;
attenuation at 1549 nm of 1.6 dB/km; and
pin array bend loss of 21.5 dB at 1549 nm.

Example 4

A further example of a DC fiber 320 in accordance with the invention, as illustrated in FIG. 5, was also modeled. The central core segment 322 has an α-profile with α of 2, a maximum $\Delta_1\%$ of 1.74%, and an outer radius $R_1$ of 1.83 $\mu$m. Moat segment 324 has a most negative $\Delta_2\%$ of −0.64%, and an outer radius $R_2$ of 6.35 $\mu$m. Ring segment 326 has a maximum $\Delta_3\%$ of 1.12, a midpoint radius $r_3$ of 7.28 $\mu$m and the half height width of ring segment 326 of 1.04 $\mu$m.

This DC fiber 320 in accordance with the invention has the following predicted dispersion, dispersion slope, and kappa properties:
total dispersion at 1525 nm of about −154 ps/nm-km;
total dispersion at 1549 nm of about −259 ps/nm-km;
total dispersion at 1565 nm of about −344 ps/nm-km;
dispersion slope at 1525 nm of about −3.3 ps/nm²-km;
dispersion slope at 1549 nm of about −5.2 ps/nm²-km;
dispersion slope at 1565 nm of −5.0 ps/nm²-km;
kappa at 1525 nm of about 46 nm;
kappa at 1549 nm of about 49 nm; and
kappa at 1565 nm of about 69 nm.

The model of DC fiber 320 also predicts:
cut off wavelength, $\lambda_c$, of 2041 nm (the cutoff wavelength of the highest of the $LP_{11}$ and $LP_{02}$ higher order modes above $LP_{01}$ for a straight DC fiber);
effective area, $A_{eff}$, of 19.3 $\mu m2$ at 1549 nm;
attenuation at 1595 nm of 2.0 dB/km; and
pin array bend loss of 19.7 dB at 1549 nm.

Example 5

Figure 6:
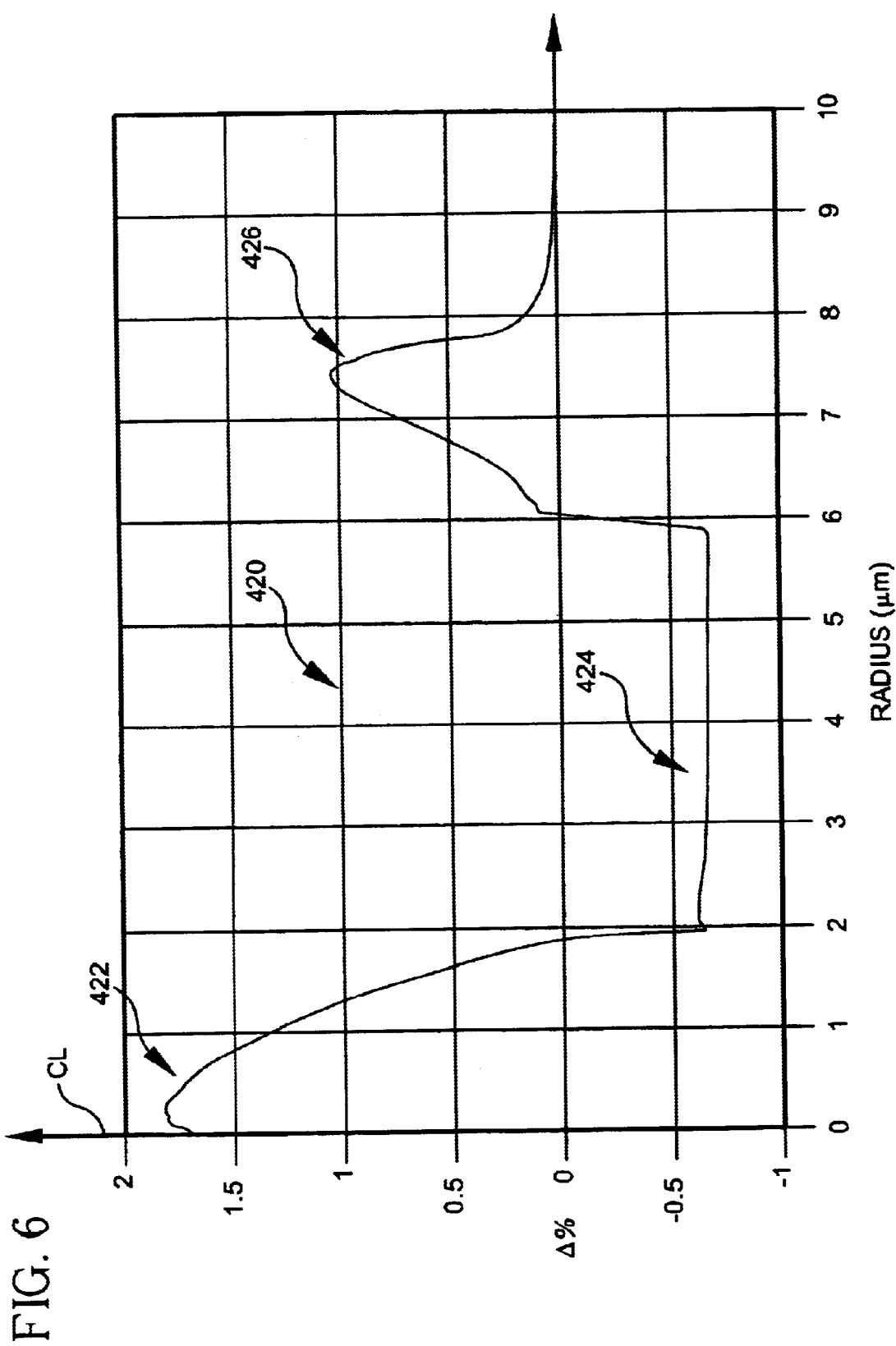
FIG. 6 is a graph of $\Delta\%$ vs. core radius (μm) of a fifth embodiment of DC fiber in accordance with the invention.

A final example of a DC fiber 420 in accordance with the invention as illustrated in FIG. 6 was also modeled. The central core segment 422 has an α-profile with α of 2, a maximum $\Delta_1$% of 1.79%, and an outer radius $R_1$ of 1.80 μm. Moat segment 424 has a most negative $\Delta_2$% of 0.67%, and an outer radius $R_2$ of 6.01 μm. Ring segment 426 has a maximum $\Delta_3$% of 1.02, a midpoint radius $r_3$ of 7.28 μm, and the half height width of ring segment 426 of 1.02 μm.

As illustrated in FIGS. 7–9, DC fiber 420 in accordance with the invention has the following predicted dispersion, dispersion slope, and kappa properties:

total dispersion at 1525 nm of about −156 ps/nm-km;
total dispersion at 1549 nm of about −266 ps/nm-km;
total dispersion at 1565 nm of about −362 ps/nm-km;
dispersion slope at 1525 nm of about −3.4 ps/nm²-km;
dispersion slope at 1549 nm of about −5.7 ps/nm²-km;
dispersion slope at 1565 nm of −5.9 ps/nm²-km;
kappa at 1525 nm of about 45 nm;
kappa at 1549 nm of about 47 nm; and
kappa at 1565 nm of about 62 nm.

The model of DC fiber 420 also predicts:

cut off wavelength, $\lambda_c$, of 2025 nm (the cutoff wavelength of the highest of the $LP_{11}$ and $LP_{02}$ higher order modes above $LP_{01}$ for a straight DC fiber);

effective area, $A_{eff}$, of 18.2 μm² at 1549 nm;

attenuation at 1549 nm of 2.1 dB/km; and pin array bend loss of 21.4 dB at 1549 nm.

Table 1 below illustrates preferred DC fiber parameters for a family of fiber profiles in accordance with the invention that result in achievement of the desired properties. Parameters are illustrated in Table 1 for the fiber designs of FIGS. 2–6 listed above. Set forth are maximum Δ% of each particular segment, as well as corresponding radii $R_i$. The cases in which the radius measurements are taken to the midpoint of a segment are labeled in the table heading. All other radii are the maximum outer radii of a given segment as well as the minimum inner radii of the next adjacent segment, where the segments are counted beginning with 1 (corresponding to the central core segment) and proceeding outward to 4 (corresponding to the start of the cladding). These other radii are measured to the point where the profile crosses the cladding refractive index.

TABLE 1

| Example | 1 | 2 | 3 | 4 | 5 |
| --- | --- | --- | --- | --- | --- |
| $\Delta_1$ % | 1.87 | 1.80 | 1.80 | 1.74 | 1.79 |
| $R_1$ (μm) | 1.77 | 1.81 | 1.81 | 1.83 | 1.80 |
| $\Delta_2$ % | −0.71 | −0.67 | −0.67 | −0.64 | −0.67 |
| $R_2$ (μm) | 5.33 | 5.59 | 5.68 | 6.35 | 6.01 |
| $\Delta_3$ % | 0.73 | 0.79 | 0.81 | 1.12 | 1.02 |
| $R_3$ (μm) | 8.03 | 7.79 | 7.81 | 7.28 | 7.28 |
| $R_4$ (μm) | 9.52 | 9.34 | 9.38 | 8.94 | 8.90 |
| Alpha Central Core (units) | 2 | 2 | 2 | 2 | 2 |
| Dispersion @ 1549 nm (ps/nm-km) | −147 | −160 | −164 | −259 | −266 |
| Dispersion Slope @ 1549 nm (ps/nm²-km) | −3.4 | −3.6 | −3.9 | −5.2 | −5.7 |
| Kappa @ 1549 nm (nm) | 43 | 45 | 42 | 49 | 47 |
| Mode Field Diameter (μm) @ 1549 nm | 4.26 | 4.39 | 4.38 | 4.65 | 4.55 |
| Aeff (μm²) @ 1549 nm | 14.2 | 15.4 | 15.3 | 19.3 | 18.2 |
| $\lambda_c$ (nm) | 1993 | 2006 | 2011 | 2041 | 2025 |

The preform for the present invention DC fiber 20 may be manufactured in accordance with any known method, such as a chemical vapor deposition method such as OVD, MCVD, PCVD or the like and subsequently drawn into the DC fiber by conventional methods. Most preferably, the DC fiber preform may be manufactured by an OVD method wherein the preform portion corresponding to the central core segment 22 is first manufactured by depositing silicon oxide soot doped with germania oxide onto a rotating tapered alumina mandrel to a desired diameter. The soot is doped with the appropriate level of germania dopant to achieve the desired refractive index profile for the central core segment including the appropriate $\Delta_1$%. The mandrel is then removed and the soot preform constituting the central core segment 22 is thoroughly dried in a preferably helium and chlorine containing environment and then consolidated in a consolidating furnace including a helium atmosphere. The consolidated central core blank is then redrawn into a single-segment core cane. During the redraw process, the centerline aperture resulting from removal of the mandrel is closed through the application of a vacuum or by other known methods.

Redrawn single-segment core cane then becomes the target deposition surface for the application of further soot to form the preform portion corresponding to the moat segment 24. Silica soot is deposited onto the cane to an appropriate diameter for the moat and is then preferably dried within a consolidation furnace within a helium- and chlorine-containing atmosphere in a consolidation furnace. The soot preform is then doped with a suitable fluorine-containing gas, such as $C_2F_6$, $C_2F_2Cl_2$, $CF_4$, $SF_6$, or $SiF_4$, for example, and subsequently consolidated and again redrawn into a two-segment core cane. U.S. Pat. No. 4,629,485 to Berkey describes one such method for fluorine doping an optical fiber preform.

This two-segment core cane material now becomes the deposition surface for the preform portion corresponding to the ring segment 26. Germania-doped silica soot is next deposited on the two-segment cane and is subsequently dried and consolidated as herein before described. Again, the consolidated blank is redrawn and this time becomes the final core cane including three segments corresponding to the three segments 22, 24, 26 of the segmented core. Additional silica soot that comprises the cladding 30 is then deposited on the final core cane to form the overclad soot blank. The overclad soot blank is dried and consolidated and subsequently transferred to a draw furnace where the DC fiber is drawn therefrom. Although particular examples of the DC fiber have been disclosed and described herein, it will be apparent to those of ordinary skill in the art that various modifications and variations can be made to the present invention without departing from the scope of the invention. Thus, it is intended that the present invention covers such modifications and variations of this invention provided they come within the scope of the appended claims and their equivalents.

What is claimed is:

1. A dispersion compensating optical fiber, comprising:
   a refractive index profile selected to provide
      a dispersion slope more negative than −3.4 ps/nm²-km at 1549 nm wherein the profile has a moat segment having a $\Delta_2\%$ that is more negative than −0.4.

2. The dispersion compensating optical fiber of claim 1 wherein a total dispersion is more negative than −125 ps/nm-km at 1549 nm.

3. The dispersion compensating optical fiber of claim 2 wherein the total dispersion is more negative than −165 ps/nm-km at 1549 nm.

4. The dispersion compensating optical fiber of claim 2 wherein the total dispersion is more negative than about −200 ps/nm-km at 1549 nm.

5. The dispersion compensating optical fiber of claim 2 wherein the total dispersion is more negative than about −250 ps/nm-km at 1549 nm.

6. The dispersion compensating optical fiber of claim 1 wherein a total dispersion at 1549 nm is between about −100 ps/nm-km and −300 ps/nm-km.

7. The dispersion compensating optical fiber of claim 6 wherein the total dispersion at 1549 nm is between about −165 ps/nm-km and −270 ps/nm-km.

8. The dispersion compensating optical fiber of claim 6 wherein the total dispersion at 1549 nm is between about −100 ps/nm-km and −165 ps/nm-km.

9. The dispersion compensating optical fiber of claim 1 wherein the total dispersion is between about −75 ps/nm-km and −375 ps/nm-km over an entire C-band between 1525 nm to 1565 nm.

10. The dispersion compensating optical fiber of claim 1 further comprising a dispersion slope more negative than −4.0 ps/nm²-km at 1549 nm.

11. The dispersion compensating optical fiber of claim 10 wherein the dispersion slope is more negative than −4.5 ps/nm²-km at 1549 nm.

12. The dispersion compensating optical fiber of claim 10 wherein the dispersion slope is more negative than −5.0 ps/nm²-km at 1549 nm.

13. The dispersion compensating optical fiber of claim 1 wherein the dispersion slope is more negative than −1.5 ps/nm²-km over a C-Band defined as a wavelength band between 1525 nm and 1565 nm.

14. The dispersion compensating optical fiber of claim 1 wherein the dispersion slope ranges between −3.4 ps/nm²-km and −6.3 ps/nm²-km at 1549 nm.

15. The dispersion compensating optical fiber of claim 14 wherein the dispersion slope ranges between −4.5 ps/nm²-km and −6.0 ps/nm²-km at 1549 nm.

16. The dispersion compensating optical fiber of claim 1 wherein the dispersion slope is more negative than −4.0 ps/nm²-km at 1549 nm and a total dispersion is more negative than −200 ps/nm-km at 1549 nm.

17. The dispersion compensating optical fiber of claim 1 further including a kappa value defined as the total dispersion at 1549 nm divided by the dispersion slope at 1549 nm of less than 60.

18. The dispersion compensating optical fiber of claim 1 further including a kappa value defined as the total dispersion at 1549 nm divided by the dispersion slope at 1549 nm of less than 52.

19. The dispersion compensating optical fiber of claim 1 further including a kappa value defined as total dispersion at 1549 nm divided by dispersion slope at 1549 nm of between 35 nm and 55 nm.

20. The dispersion compensating optical fiber of claim 19 further including a kappa value defined as total dispersion at 1549 nm divided by dispersion slope at 1549 nm of between 40 nm and 52 nm.

21. The dispersion compensating optical fiber of claim 19 further including a kappa value defined as total dispersion at 1549 nm divided by dispersion slope at 1549 nm of between 40 nm and 48 nm.

22. The dispersion compensating optical fiber of claim 1 further comprising a range of kappa values defined as the dispersion at a particular wavelength divided by the dispersion slope at the particular wavelength over the range of 1525 nm to 1565 nm of between 35 nm to 75 nm.

23. The dispersion compensating optical fiber claim 1 wherein the refractive index profile includes:
   a central core segment having a $\Delta_1\%$,
   a moat segment abutting the central core segment having a $\Delta_2\%$, and
   a ring segment surrounding the moat segment having a $\Delta_3\%$
   wherein $\Delta_1\%$ is positive, $\Delta_2\%$ is negative, and $\Delta_3\%$ is positive, all as compared to cladding.

24. The dispersion compensating optical fiber of claim 23 wherein
   $\Delta_1\%$ is greater than 1.5%;
   $\Delta_2\%$ more negative than −5%; and
   $\Delta_3\%$ greater than 0.5%.

25. The dispersion compensating optical fiber of claim 23 wherein
   $\Delta_1\%$ is between 1.5% and 2.2%;
   $\Delta_2\%$ is between −0.5% and −0.8%; and
   $\Delta_3\%$ is between 0.5% and 1.3%.

26. The dispersion compensating optical fiber of claim 23 wherein
   $\Delta_1\%$ is between 1.6% and 1.9%;
   $\Delta_2\%$ is between −0.6% and −0.75%; and
   $\Delta_3\%$ is between 0.65% and 1.2%.

27. The dispersion compensating optical fiber of claim 23 wherein
   $\Delta_1\%$ is between 1.7% and 1.9%;
   $\Delta_2\%$ is between −0.6% and −0.75%; and
   $\Delta_3\%$ is between 0.7% and 1.2%.

28. The dispersion compensating optical fiber of claim 1 further comprising a ring segment having $\Delta_3\%$ greater than 0.5%.

29. The dispersion compensating optical fiber of claim 27 further comprising a moat segment having $\Delta_2\%$ more negative than −0.65%.

30. The dispersion compensating optical fiber of claim 28 further comprising a central core segment having $\Delta_1\%$ greater than 1.7%.

31. The dispersion compensating optical fiber of claim 1, further comprising a pin array of less than 40 dB at 1549 nm.

32. The dispersion compensating optical fiber of claim 31, further comprising a pin array of less than 30 dB at 1549 nm.

33. The dispersion compensating optical fiber of claim 31, further comprising a pin array of less than 25 dB at 1549 nm.

34. The dispersion compensating optical fiber of claim 1, further comprising:
   a central core segment having an outer radius $R_1$ in a range of between about 1.5 μm and 2.2 μm;
   a moat segment having an outer radius $R_2$ in a range of between about 5.0 μm and 6.7 μm; and
   a ring segment having a midpoint radius $R_3$ in a range of between about 6.5 μm and 9.0 μm.

35. The dispersion compensating optical fiber of claim 1, further comprising:
   a central core segment having an outer radius $R_1$ in a range of between about 1.7 μm and 1.9 μm;
   a moat segment having an outer radius $R_2$ in a range of between about 5.3 μm and 6.4 μm; and
   a ring segment having a midpoint radius $R_3$ in a range of between about 7.2 μm and 8.3 μm.

36. The dispersion compensating optical fiber of claim 1, further comprising:
   a central core segment having a $\Delta_1\%$ in the range between about 1.7% to 1.9% and a radius $R_1$ in the range between about 1.7 µm to 1.9 µm,
   a moat segment having a $\Delta_2\%$ in the range between about −0.6% to −0.75% and a radius $R_2$ in the range between about 5.3 µm to 6.4 µm, and
   a ring segment having a $\Delta_3\%$ in the range between about 0.7% to 1.1%, a mid point radius $R_3$ in the range between about 7.2 µm to 8.3 µm.

37. The dispersion compensating optical fiber of claim 1, further comprising:
   a central core segment having an outer radius $R_1$;
   a moat segment having an outer radius $R_2$ wherein a core/moat ratio defined as $R_1$ divided by $R_2$ is less than 0.34.

38. The dispersion compensating optical fiber of claim 37 wherein the core/moat ratio is less than 0.33.

39. The dispersion compensating optical fiber of claim 37 wherein the core/moat ratio is less than 0.32.

40. The dispersion compensating optical fiber of claim 1, further comprising:
   a moat segment having an outer radius $R_2$; and
   a ring segment having a midpoint radius $R_3$ wherein a product (P) equal to $R_2$ times $R_3$ is in a range of between about 4.0 µm² and 50 µm².

41. The dispersion compensating optical fiber of claim 40 wherein the product (P) is in a range of between about 42 µm² and 48 µm².

42. The dispersion compensating optical fiber of claim 40 wherein the product (P) ranges between about 43 µm² and 46 µm².

43. The dispersion compensating optical fiber of claim 1, further comprising an effective area of greater than 13 µm² at 1549 nm.

44. The dispersion compensating optical fiber of claim 40, further comprising an effective area of greater than 15 µm² at 1549 nm.

45. The dispersion compensating optical fiber of claim 40, further comprising an effective area of greater than 17 µm² at 1549 nm.

46. A dispersion compensating optical fiber, comprising:
   a refractive index profile selected to provide
      a dispersion slope more negative than −4.0 ps/nm²-km at 1549 nm.

47. The dispersion compensating optical fiber of claim 46, further comprising a total dispersion more negative than −125 ps/nm-km at 1549 nm.

48. The dispersion compensating optical fiber of claim 47, further comprising a kappa defined as the total dispersion divided by the dispersion slope of between 40 and 48 nm at 1549 nm.

49. An optical transmission system, comprising:
   a refractive index profile selected to provide
      a dispersion slope more negative than −3.4 ps/nm²-km at 1549 nm wherein the profile has a moat segment having a $\Delta_2\%$ that is more negative than −40.4.

50. The optical transmission system of claim 49 further comprising a total dispersion at 1549 nm more negative than −125 ps/nm-km.

51. The optical transmission system of claim 50 further comprising a non-zero dispersion shifted fiber optically coupled to the dispersion compensating fiber, the non-zero dispersion shifted fiber having a dispersion slope of between about 0.07 and 0.1 ps/nm²-km at 1549 nm.

52. The optical transmission system of claim 51 wherein the non-zero dispersion shifted fiber has a total dispersion of between about 3.4 and 5.0 ps/nm-km at 1549 nm.

53. The optical transmission system of claim 52 wherein the system further includes a trim fiber optically coupled to the dispersion compensating fiber having a total dispersion of between about 14 and 20 ps/nm-km at 1549 nm and the trim fiber has a length of greater than 0.05 km.

54. The optical transmission system of claim 53 wherein the trim fiber has a dispersion slope of between about 0.04 and 0.07 ps/nm²-km at 1549 nm.

55. The optical transmission system of claim 53 wherein the trim fiber has a kappa defined as total dispersion divided by dispersion slope of between about 370 and 250 nm at 1549 nm.

56. The optical transmission system of claim 50 wherein the system further includes:
   a transmission fiber optically coupled to the dispersion compensating fiber, the transmission fiber being at least 30 times longer in length than a length dispersion compensating fiber, the transmission fiber having a positive dispersion slope and positive total dispersion, and
   a trim fiber optically coupled to the dispersion compensating fiber having a positive dispersion slope and a positive dispersion wherein the dispersion slope of the trim fiber is less than the dispersion slope of the transmission fiber and a length of the trim fiber is greater than 0.05 km.

57. The optical transmission system of claim 56 wherein a total dispersion of the trim fiber is greater than the transmission fiber.

58. The optical transmission system of claim 56 wherein a length of the trim fiber is greater than a length of the dispersion compensating fiber.

59. An optical transmission system, comprising:
   a dispersion compensating fiber, having a dispersion slope more negative than −3.4 ps/nm²-km at 1549 nm;
   a transmission fiber optically coupled to the dispersion compensating fiber, the transmission fiber having a positive dispersion slope between 0.07 and 0.1 ps/nm²-km at 1549 nm and positive total dispersion between 3.4 and 5.0 ps/nm-km at 1549 nm; and
   a trim fiber optically coupled to the dispersion compensating fiber having a dispersion slope between 0.04 and 0.07 ps/nm²-km at 1549 nm and a total dispersion between 14 and 20 ps/nm-km at 1549 nm wherein a length of the transmission fiber is greater than 0.05 km.

60. An optical transmission system, comprising:
   a dispersion compensating fiber, having a dispersion slope more negative than −3.4 ps/nm²-km at 1549 nm;
   a transmission fiber optically coupled to the dispersion compensating fiber, the transmission fiber having a positive dispersion slope at 1549 nm and positive total dispersion at 1549 nm; and
   a trim fiber optically coupled to the dispersion compensating fiber having a positive dispersion slope ps/nm²-km at 1549 nm and a positive total dispersion at 1549 nm wherein the positive total dispersion of the trim fiber is grater than the positive total dispersion of the transmission fiber and the positive dispersion slope of the trim fiber is less than the positive dispersion slope of the transmission fiber and a length of the transmission fiber is greater than 0.05 km.

* * * * *

UNITED STATES PATENT AND TRADEMARK OFFICE
CERTIFICATE OF CORRECTION

PATENT NO. : 6,711,332 B2
DATED : March 23, 2004
INVENTOR(S) : Hebgen et al.

It is certified that error appears in the above-identified patent and that said Letters Patent is hereby corrected as shown below:

Title page,
Item [57], ABSTRACT,
Line 9, "-3.4 ps/nM$^2$-km" should be -- -3.4 ps/nm$^2$ –km --

Column 17,
Line 58, "this is more negative than -40.4." should be -- this is more negative than -0.4. --

Signed and Sealed this

Thirtieth Day of November, 2004

JON W. DUDAS
*Director of the United States Patent and Trademark Office*